Nov. 21, 1961  A. CORNET  3,009,749
PISTONS

Filed Sept. 14, 1959  2 Sheets-Sheet 1

INVENTOR
ANDRE CORNET
By Irwin S. Thompson
ATTY.

Nov. 21, 1961   A. CORNET   3,009,749
PISTONS

Filed Sept. 14, 1959   2 Sheets-Sheet 2

INVENTOR
ANDRE CORNET
By Irwin S. Thompson
ATTY.

United States Patent Office 3,009,749
Patented Nov. 21, 1961

3,009,749
PISTONS
Andre Cornet, 31 Bis Rue Louise Michel,
Levallois Perret, France
Filed Sept. 14, 1959, Ser. No. 839,674
Claims priority, application France Sept. 13, 1958
8 Claims. (Cl. 309—10)

The present invention relates to pistons, especially for heat engines, compressors and other machines in which pistons are subjected to considerable mechanical and thermal stresses.

The present application is a continuation in part of the U.S. application Serial No. 739,153 filed on June 2, 1958, for Pistons, in which the applicant has described a piston having a large number of advantages as compared with the usual pistons by virtue of a more rational structure both from the mechanical and the thermal point of view. This piston was constructed of sheet metal, for example of steel, in a number of parts assembled together by welding, with an internal armature serving as a support for the gudgeon pin bearing and welded on the one hand to the base of the piston and on the other hand to the bottom of the skirt.

The advantages of this type of construction consisted especially in that the internal armature provided a direct evacuation path for the heat from the head of the piston towards the skirt, this path so to speak short-circuiting the segment-carrier head whilst ensuring on the other hand a stiffening of the structure by giving it a greater rigidity in the direction of the pivotal movement.

The researches continued by the applicant have shown that the greater part of the arrangements described within the scope of the application referred to above in connection with their application to pistons of sheet metal, can also be adapted with similar advantages to pistons obtained by casting, stamping, extrusion, deep-drawing or by any other method of manufacture whatever.

An object of the present invention thus consists in the application to pistons in general, produced by any desired method of construction, characterised by the combination with a skirt of generally cylindrical form, closed at one end by a bottom and comprising two bearing bosses for the gudgeon pin facing two diametrically-opposite lateral openings in the said skirt, of at least one armature or internal stiffening partition adapted to support the said bosses and connected on the one hand to the said bottom and on the other hand to a zone of the internal face of the skirt which is located opposite the said bottom with respect to the said bosses.

A further object of the invention is the provision, with respect to cast pistons of light or other alloys, of a structure having the advantages of a rational evacuation of the heat from the piston head and of a mechanical stiffening of the skirt in the direction of the pivotal or rocking movement.

A further object of the invention is a structure of a cast piston which provides an improved guiding action together with a considerable reduction of the clearance in the cylinder as compared with the minimum values required for the constructions known up to the present time.

The invention is also directed to a simplification of the machining operations on cast pistons together with a corresponding reduction in the cost of production.

A piston in accordance with the invention comprising a segment-carrier head, a guiding skirt in an associated cylinder and a pair of gudgeon pin bosses is especially characterised in that interruptions are formed on at least one part of the junction between the ring-carrier head and the skirt, whilst internal partition means establish a direct mechanical and thermal connection between the bottom of the said head and the inner wall of the skirt.

In accordance with a further feature of the invention, interruptions are also formed on at least one part of the junction between the skirt and the bosses, the latter being fixed to the partition means.

First of all from the thermal point of view, these arrangements provide the advantage of creating a flow path for the heat from the bottom of the piston towards the skirt by the partition means which are also exposed to the cooling action of splashing oil from the sump, while furthermore they reduce the thermal load of the ring-carrier head and of the piston rings themselves due to the interruptions formed in the zone of coupling to the skirt. From the mechanical point of view, the advantages obtained are also considerable, particularly by virtue of the rigidity which the partition means can give to the piston in the most favourable direction. The at least partial de-coupling of the skirt with respect to the bosses enables the said skirt to be given a great liberty of deformation under the effect of thermal stresses, whilst at the same time remaining in contact with the cylinder with a clearance which is on the one hand considerably reduced and on the other hand quite uniform.

A further important consequence of the arrangements according to the invention consists in the possibility of the elimination of the critical zones which exist in known pistons at the coupling points between the bosses and the skirt; experience has shown that the seizures and deterioration of pistons are practicaly always localized in these four zones of transition between the solid blocks of the bosses and the relatively thin wall of the skirt. These critical zones, which constitute the weak points of known pistons become on the contrary the zones of the greatest strength in the pistons according to the invention, when, in accordance with one preferred form of embodiment, the partition means are precisely coupled to the skirt on each side of the bosses so as to form reinforcements which ensure the stiffening of the skirt in these zones, the latter furthermore playing the principal part in the work of guiding proper of the little end of the connecting rod.

The structure according to the invention, particularly by virtue of the very great flexibility given to the skirt by the various clearances provided, enables the piston, during the course of operation and while hot, to take up the profile of the associated cylinder lining, whatever deformations the latter may be subjected to in practice. A consequence of fundamental importance which results from this consists in the possibility of giving the piston a perfectly cylindrical form during its machining, whilst the actual technique of the present day necessitates machining of pistons to shapes which are often very complicated (elliptic, frusto-conical, cambered, etc.) which are determined by empirical and for the greater part arbitrary methods. The machining of these conical, oval, cambered, etc., pistons is costly, necessitating the use of very special lathes, and the pistons never give entirely satisfactory results; as soon as a little wear occurs, the piston fails. It would therefore appear certain that the possibility afforded by the invention of giving the piston the form of a true cylinder of revolution sliding with a very small clearance in the bore of the cylinder, constitutes an advantage of a fundamental character having a revolutionary effect in connection with pistons for heat engines.

The particular features and advantages of the invention will further be brought out in the description which follows below of a cast piston constructed in accordance with the invention, reference being made to the accompanying drawings, in which.

Figure 3:
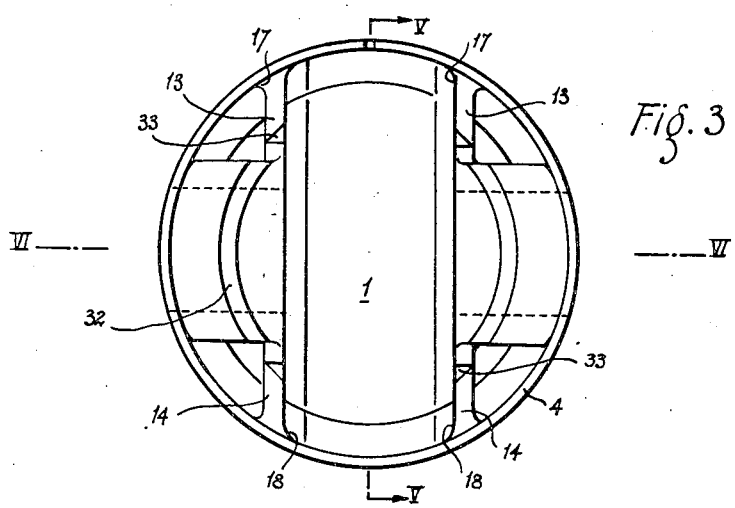
FIG. 3 is a view looking on the underside of the piston shown in FIGS. 1 and 2.
Figure 1:
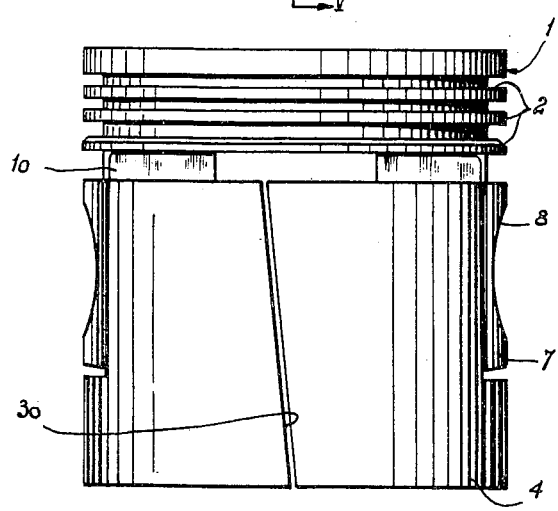
FIG. 1 is a front view in elevation of a piston in accordance with the invention.
Figure 2:
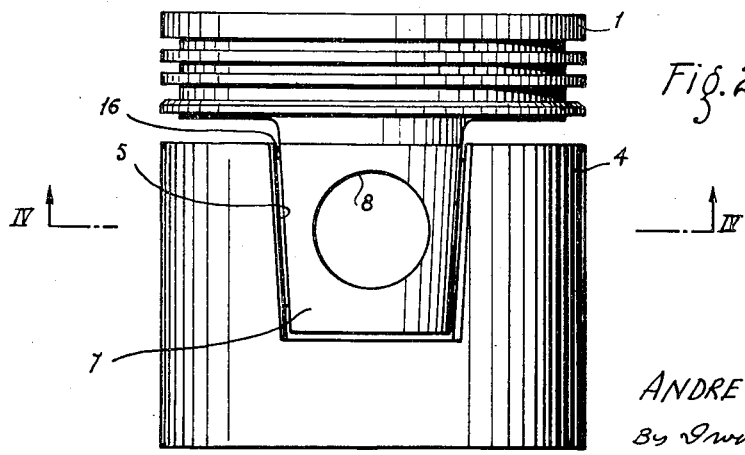
FIG. 2 is a side view of the same piston.
Figure 4:
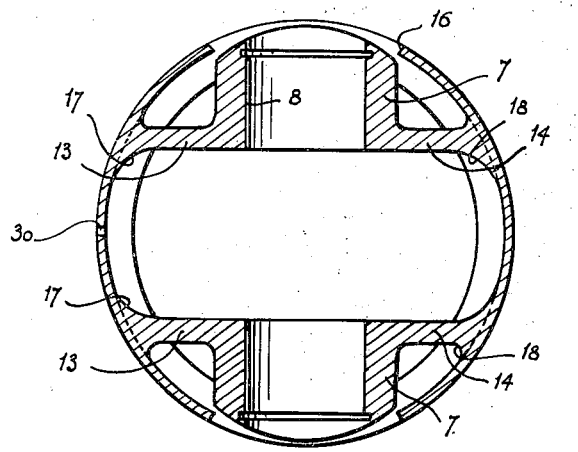
FIG. 4 is a plan view of this piston in cross-section taken along the line IV—IV of FIG. 2.
Figure 5:
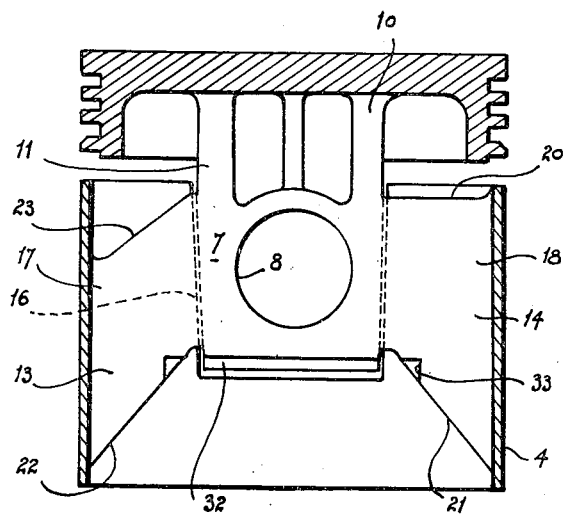
FIGS. 5 and 6 are views in elevation of the same piston in cross-section taken along the lines V—V and VI—VI respectively of FIG. 3.
Figure 6:
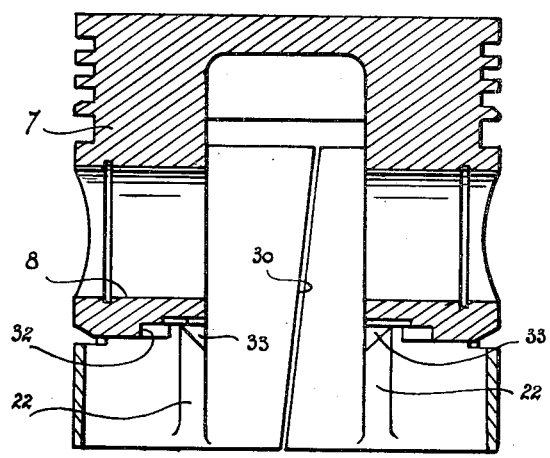

The piston shown in FIGS. 1 to 6, more particularly intended for an explosion engine, comprises a cylindrical head 1 with a flat bottom, in the lateral surface of which are formed grooves 2 intended to receive gas-tight rings or scraper rings, a cylindrical skirt 4 arranged under this head and provided in its upper edge with two lateral slots 5 in the shape of a trapezium, the slots being diametrically opposite, and two bosses 7 each comprising a cylindrical bearing surface 8 for the gudgeon pin associated with the piston. Each boss is adapted to engage in one of the slots 5 in the skirt, and is connected on the one hand towards the top to the head 1 by a partition 10 provided with stiffening ribs 11, and on the other hand on the sides to the skirt by two side partitions 13 and 14. A space 16 is formed between the walls of each boss 7 and the walls of the skirt, facing these latter. The side partitions 13 and 14 of a boss are substantially in line with the internal face of this boss and are coupled to the inner wall of the skirt by fillets which form reinforcing stiffeners 17 and 18 respectively.

The partitions 14 of each boss 7 are arranged facing each other and are coupled by an edge or ridge 20, substantially horizontal with respect to the part of the upper edge of the skirt which faces them, and by an edge 21 inclined substantially at 45° towards the bottom from the boss, at the lower edge of the skirt.

The partitions 13 are connected in turn to the skirt at their lower portions by an edge 22, symmetrical with the edge 21 with respect to the diametral plane passing through the axes of the bosses, and at their upper portions by a slightly inclined edge 23 which terminates on the skirt below the upper edge of said skirt.

A compensation slot 30, slightly inclined with respect to the vertical is formed over the entire height of the skirt in the portion of this latter comprised between the partitions 13 of the bosses.

This slot 30 has the object of permitting, to a certain extent circumferential expansion of the skirt, the latter thus continuing to be applied with precision against the associated wall of the cylinder.

During assembly, the piston is arranged in such manner that this compensation slot, flanked in the manner already explained by the partitions 13, is located opposite to the zone of the skirt which the explosion tends to force against the cylinder wall, account being taken of the inclination of the connecting rod at the moment of the explosion.

The piston unit comprising the head, the skirt and the bosses with their partitions, is constructed by moulding in a single piece, for example in a light alloy.

A cylindrical assembly surface 32, concentric with the axis of revolution of the piston, is formed in the bottom of the bosses 7 and provides slots 33 in the lower webs of the lateral partitions 13 and 14.

By virtue of the assembly surface 32, it is possible to machine the piece by taking it directly in the chuck on the pin bosses, which reduces the overhang and enables the piece to be firmly clamped without this clamping resulting in any deformation of the skirt itself. It is in fact known that in the usual types of piston, this skirt is very sensitive to the clamping stresses which are directly applied to it.

It is during the course of this machining that the bearing surfaces of the grooves and of the shoulders of the head of the piston are ground, and that the skirt is turned externally, the skirt being perfectly cylindrical in the present form of piston, as has been already stated.

The partitions 13 and 14 which connect the bosses to the skirt, oriented perpendicularly to the axes of the bosses, ensure a great rigidity for the skirt in the direction of pivotal movement of the piston, this rigidity being further augmented by virture of the presence of the reinforcing stiffeners 17 and 18.

The lateral partitions 14 opposite to the slot 30, are connected to the skirt over practically the entire height of this latter by the stiffening rib 18. The rigidity which results from this arrangement enables the piston to withstand the effects of the rocking movement of the head with respect to the skirt during the explosion.

On the other hand, the height of coupling of the partitions 13 to the skirt is smaller; the necessary rigidity is ensured, while a certain flexibility permits of the free action of the compensation slot 30.

It has been seen that the absence of appreciable thermal stresses in the skirt in the vicinity of the bosses, in the so-called critical zones, enables this skirt to be given the form of a true cylinder of revolution, and makes its machining much more simple. In addition, by virtue of the reduction of the clearance between the skirt and the cylinder, this permits of a better evacuation of the heat received by the top of the piston towards the walls of the cylinder.

It will of course be understood that the present invention is not limited to the form of embodiment described and shown, which has been given only by way of example. The invention can on the contrary form the subject of a large number of alternative forms which, for example, may comprise only a part of the particular features of the invention.

On the other hand, it will be clear from the foregoing description, and also from the prior application referred to, that the characteristic arrangements of the invention can be adapted to pistons of the most varied types, irrespective of their method of manufacture; within the scope of the present description, more particular emphasis has been laid on the case of cast pistons, in which this adaptation would appear at first sight to be the most difficult to effect.

It is possible to envisage, for example, the manufacture of piston bodies by hot or cold extrusion, the stiffening armature or armatures being added, at the same time as the gudgeon pin bearings, by welding, brazing, or any other means.

What I claim is:

1. A piston comprising a cylindrical skirt portion, a top portion closing said skirt portion at one end, a pair of wrist or gudgeon pin bosses respectively facing and aligned with two diametrically opposed lateral openings provided in said skirt portion, and at least one internal partition means serving to give rigidity to said piston and to support said bosses comprising a substantially straight and plane partition positioned transversely to the gudgeon pin axis and having an upper connection to the inner face of said top portion and two lateral connections with the inner face of said skirt portion, said lateral connections extending along a major portion of said skirt portion and below said gudgeon pin axis, said piston comprising a portion forming a ring-carrier head between the top face of said piston and said skirt portion for guiding said piston in the associated cylinder, and further comprising discontinuities formed in at least one part of the junction between said ring-carrier head and said skirt, said partition means establishing a direct mechanical and thermal coupling between said ring-carrier head and the inner wall of said skirt.

2. A piston as claimed in claim 1, in which said discontinuities are also formed on at least one part of the junction between said skirt and said bosses, said bosses being coupled to said partition means.

3. A piston comprising a cylindrical skirt portion, a top portion closing said skirt portion at one end, a pair of wrist or gudgeon pin bosses respectively facing and aligned with two diametrically opposed lateral openings provided in said skirt portion, and at least one internal partition means serving to give rigidity to said piston and to support said bosses comprising a substantially straight and plane partition positioned transversely to the gudgeon pin axis and having an upper connection to the inner face of said top portion and two lateral connections with the inner face of said skirt portion, said lateral connections extending along a major portion of said skirt portion and below said gudgeon pin axis, said partition means being connected to said skirt along four generator lines arranged on each side of the zone of said bosses.

4. A piston as claimed in claim 3, in which the connections of said partition means to the inner face of said skirt are opened out so as to form reinforcing stiffeners for said skirt along said four generator lines.

5. A piston as claimed in claim 4, in which said reinforcing stiffeners extend over a greater height on the side opposite to a compensation slot formed on one side of said gudgeon pin than the side adjacent said compensation slot.

6. A piston as claimed in claim 1, in which said partition means comprise partitions located perpendicularly to said gudgeon pin and substantially in line with the inner faces of said bosses.

7. A piston as claimed in claim 1, in which the outer wall of said skirt portion is formed as a true cylinder of revolution.

8. A piston as claimed in claim 1, in which said skirt portion is provided with a compensation slot formed on one side of said gudgeon pin.

References Cited in the file of this patent

UNITED STATES PATENTS

| | | |
|---|---|---|
| 1,092,870 | Spillman et al. | Apr. 14, 1914 |
| 1,990,393 | Weller | Feb. 5, 1935 |
| 2,038,754 | Nelson | Apr. 28, 1936 |
| 2,829,017 | Turlay | Apr. 1, 1958 |